United States Patent [19]
Kapeller

[11] 3,894,341
[45] July 15, 1975

[54] RAPID RESETTING GYROSCOPE

[75] Inventor: Klaus Kapeller, Edingen, Germany

[73] Assignee: Teldix GmbH, Heidelberg, Germany

[22] Filed: Dec. 21, 1973

[21] Appl. No.: 427,425

[30] Foreign Application Priority Data
Dec. 23, 1972 Germany............................ 2263338

[52] U.S. Cl. ................................................. 33/324
[51] Int. Cl.² ........................................ G01C 19/38
[58] Field of Search .............................. 33/324, 361

[56] References Cited
UNITED STATES PATENTS
3,231,984  2/1966  Howe et al............................ 33/324
3,518,771  7/1970  Schultz et al. ....................... 33/324

FOREIGN PATENTS OR APPLICATIONS
1,954,790  5/1971  Germany ............................. 33/324

*Primary Examiner*—William D. Martin, Jr.
*Attorney, Agent, or Firm*—Spencer & Kaye

[57] ABSTRACT

In a north-seeking gyroscope having a gyroscope rotor mounted in a gimbal which is in turn pivotally mounted in a frame, and a servo unit rotating the frame in a direction to establish a null orientation of the frame relative to the rotor axis in response to a parameter representative of the current deflection from such null position, means are provided for accelerating the pivoting of the rotor axis toward the north at least temporarily before the rotor axis reaches a small deviation angle from the north direction.

5 Claims, 4 Drawing Figures

RAPID RESETTING GYROSCOPE

BACKGROUND OF THE INVENTION

The present invention relates to a north-seeking gyro having a gimbal accommodating the gyro rotor and journalled in a frame to be rotatable about a substantially vertical axis, the frame being arranged in a housing to be rotatable about an axis as vertical as possible, and in particular to a gyro which includes a servo device which effects, via a setting member, an attenuated resetting of the frame in the direction to reduce the deflection of the gimbal with respect to the frame.

Such a gyro is described in German Offenlegungsschrift (Laid Open Application) No. 1,548,537, corresponding to U.S. Pat. No. 3,518,771, and includes substantially a highly sensitive rate gyro with a horizontal rotor axis. Due to the above-mentioned arrangement of the gimbal, frame and housing, the horizontal component of the rate of rotation of the earth produces a north-driving moment which deflects the gimbal about its axis. This deflection is detected by an angle sensor disposed between the frame and gimbal and effects, via a setting drive, such as a motor, torque generator, etc., a resetting of the frame. This is done until the vector of the horizontal component of the rate of rotation of the earth coincides with the spin vector of the gyro rotor, whereupon the above-mentioned deflection equals zero and the frame is aligned to the north-south direction. The above-mentioned north-seeking gyro constitutes an oscillatory system whose transient behavior while rotating into the north-south direction can be characterized, from a control point of view, by its degree of clamping. In order to realize as short a transient time as possible without overshoot, it is normally desired to attain a degree of damping = 1 (critical damping). However, there often exists the requirement that there be low sensitivity to interfering moments when the gyro has reached approximately the north direction. Such interfering moments may occur, for example, as a result of vibrations when the gyro is mounted on a vehicle. Increasing the degree of damping can reduce such sensitivity to interference, but this results in a longer transient period for the gyro.

SUMMARY OF THE INVENTION

It is an object of the present invention to reconcile these considerations.

It is a more specific object of the present invention to provide a north-seeking gyro which has, on the one hand, a short transient time for rotating into the north direction and, on the other hand, a low sensitivity to interference.

A further object of the invention is to provide a gyro which has these properties and which is inexpensive to fabricate.

These and other objects are achieved by causing the pivoting of the rotor axis toward north to be accelerated at least during part of its resetting movement.

The gyroscope according to the present invention thus has two modes of operation for the north-seeking process, which modes differ with respect to their degree of damping. As long as the alignment of the gyroscope deviates strongly from the north direction, the control device has a deattenuating influence on the above-mentioned servo device. This results in a first mode of operation which produces a rapid prealignment to the north direction for the gyroscope. This rough run-in is effected in dependence on a variable parameter which is a measure for the momentary deviation from north.

The variable parameter can be, for example, the angular speed with which the frame is caused to follow up the gimbal member. For deviations from north of more than 90° it is advisable to also consider the sign of the angular acceleration of the frame.

The angle between the gimbal and the frame, or the voltage or current applied to the setting member, can also be used as the variable parameter. Furthermore, the sign of the above-mentioned angle or the sign of the angular speed with which the gimbal is being moved can be used as the variable parameter.

When the selected variable parameter falls below a preselectable value, i.e. once the gyro reaches an orientation at which it deviates only slightly from the north direction, the control device with the deattenuating effect becomes ineffective and the gyroscope enters into its second mode of operation in which it has a correspondingly high damping and a low sensitivity to interference. The gyroscope can, in this mode, achieve a fine alignment.

In particular embodiments of the invention, the variable parameter can be measured during a first operating step and can then be stored. During a second operating step, the rapid resetting signal is generated in response to the stored value and is applied to effect rapid resetting. Then, in a third operating step the rapid resetting is terminated and the system returns to the initial resetting rate for final rotor axis and frame alignment.

In embodiments employing such signal storage, it has been found to be particularly advantageous to supply the setting member with timed signals during the prealignment with the north direction. For this purpose the state variable is measured in a first uninterfered with operating step. During a second step a signal is given to the setting member in dependence on the measured variable, while during a third operating step only the above-mentioned basic servo device is effective. Due to the damping which is effective during the third step, the gyroscope can settle down so that overshoots and instabilities are dependably avoided in spite of the temporarily very slight damping in the system. Then this procedure can be repeated until the variable parameter has fallen below a given value.

As already mentioned above, the control device emits a signal to the setting member in dependence on the above-mentioned variable parameter. This signal may be, for example, a current pulse of constant amplitude, with only its polarity depending on the variable parameter. Or, either the amplitude or the pulse width of the current pulse may be proportional to the variable parameter. Or, a single signal may be produced which effects a one-time rough alignment with north, or the deattenuating effect can be progressively reduced with decreasing deviation from the north direction.

The gyroscope disclosed in U.S. Pat. No. 3,518,771, cited above, also has an angle of inclination $\delta$ between the axes of the frame and the gimbal. This angle of inclination constitutes a resetting factor which produces a countermoment against the north-driving moment proportional to the follow-up speed of the frame. Due to the angle of inclination it becomes possible to provide the servo device with a high amplification, which results in a great north accuracy, and nevertheless to obtain a high degree of damping and low sensitivity to interference for the fine alignment.

In a preferred embodiment of the present invention, the north-seeking gyro is provided with such an angle of inclination such that the gyro, in addition to the above-mentioned advantages, is distinguished by rapid alignment with the north direction. During the prealignment stage the damping is heavily reduced by the measures of the present invention while during the fine alignment stage the damping is determined substantially by the angle of inclination.

DESCRIPTION OF THE PREFERRED EMBODIMENTS

Figure 1:
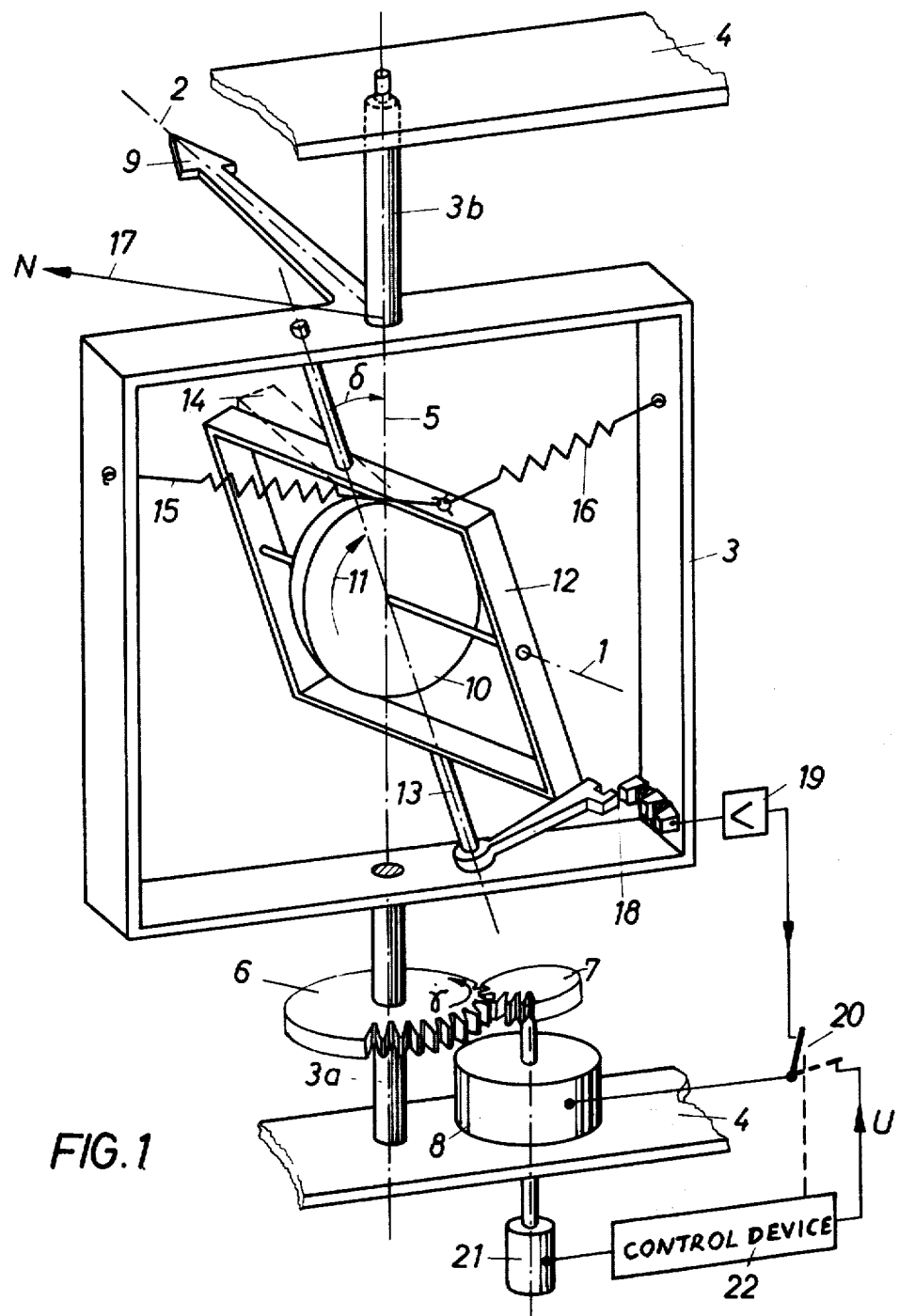
FIG. 1 is a perspective view of a gyroscope according to the invention in a state in which it is angularly offset from north.

FIG. 1 is a pictorial representation of a gyroscope having a frame 3 pivotally mounted by means of two pins 3a and 3b in a housing 4, only broken-away parts of which are shown. The frame 3 is mounted to be rotatable about the vertically oriented frame axis 5. Gear wheels 6 and 7 drive the frame 3 from a servo motor 8 fastened to the housing 4.

Instead of the usual compass card an arrow marker 9 is provided on the frame. This marker defines the frame reference axis 2 and points to geographic north when the gyroscope is fully aligned.

The gyroscope rotor 10 is mounted in a gimbal 12 to be rotatable in the direction of arrow 11 about axis 1. The gimbal axis 13 is inclined with respect to the frame axis 5 by an angle of inclination $\delta$.

With the gyroscope at rest, the gimbal 12 normally takes up the null position 14 shown in dashed lines. At this time the rotor axis 1 is parallel to the frame reference axis 2 and the relative gimbal deflection is thus zero. In this position the gimbal is held in its null position by the two springs 15 and 16.

The geographic north direction is indicated by arrow 17. When rotor 10 is rotating, a north-driving moment acts on gimbal 12 to cause the illustrated deflection of the gimbal about axis 13. This deflection is detected by the angle sensor, or pick-off, 18 and the corresponding voltage signal is fed to the servo motor 8, when switch 20 is in the illustrated position, to reset the frame 3. The operation described thus far is identical to that disclosed in U.S. Pat. No. 3,518,771.

To effect the novel operation according to the present invention, a measuring device 21 is connected to the shaft of the servo motor 8 to generate signals corresponding to the rotational speed $\dot{\gamma}$ of the housing 3 and to feed these signals to a control device 22. As can be easily proven, the polarity, or algebraic sign, of the angular acceleration $\ddot{\gamma}$ is a criterion for whether the north deviation is more or less than 90°.

The control device 22 serves to form a signal U in dependence on the measured angular velocity $\dot{\gamma}$ and on the polarity of the angular acceleration $\ddot{\gamma}$. This signal U can be conducted to servo motor 8 when switch 29 has been brought into the position shown by dashed lines. The control device 22 also serves to control the switching of switch 20.

The following mode of operation results for the gyroscope.

If the axis 1 of the gimbal deviates from the north direction, a deflection will result due to the north-driving moment between the gimbal and the frame and effects, by means of sensor 18, amplifier 19 and servo motor 8, a resetting of the housing 3 at a certain angular velocity. The resetting here takes place with a degree of damping which is determined by such system parameters as the degree of amplification, angle of inclination and the desired sensitivity to interference.

This degree of damping, however, is unfavorable for rapid alignment with the north direction. In a second operating step the control device 22 is therefore arranged to bring the switch 20 into the position shown in dashed lines. The signal U which is derived from the angular velocity measured and stored during the first step, is fed to the servo motor 8 to reset the frame with increased speed. This acts in the sense of reducing the degree of damping.

Thereafter in the third operating step the switch 20 is returned to its illustrated position and after a time of settling down the gyro continues to move in a manner corresponding to the original degree of damping. The servo device thus becomes a discontinuously operating regulator in the sense of a reduction of the degree of damping. This type of action is effective until the deviation from north has become very slight. The switch-off criterion is the measured angular velocity or other variable parameter which constitutes a measure for the deviation from north. Finally, the fine alignment is effected with the original degree of damping, resulting in a low sensitivity to interference.

Figure 4:
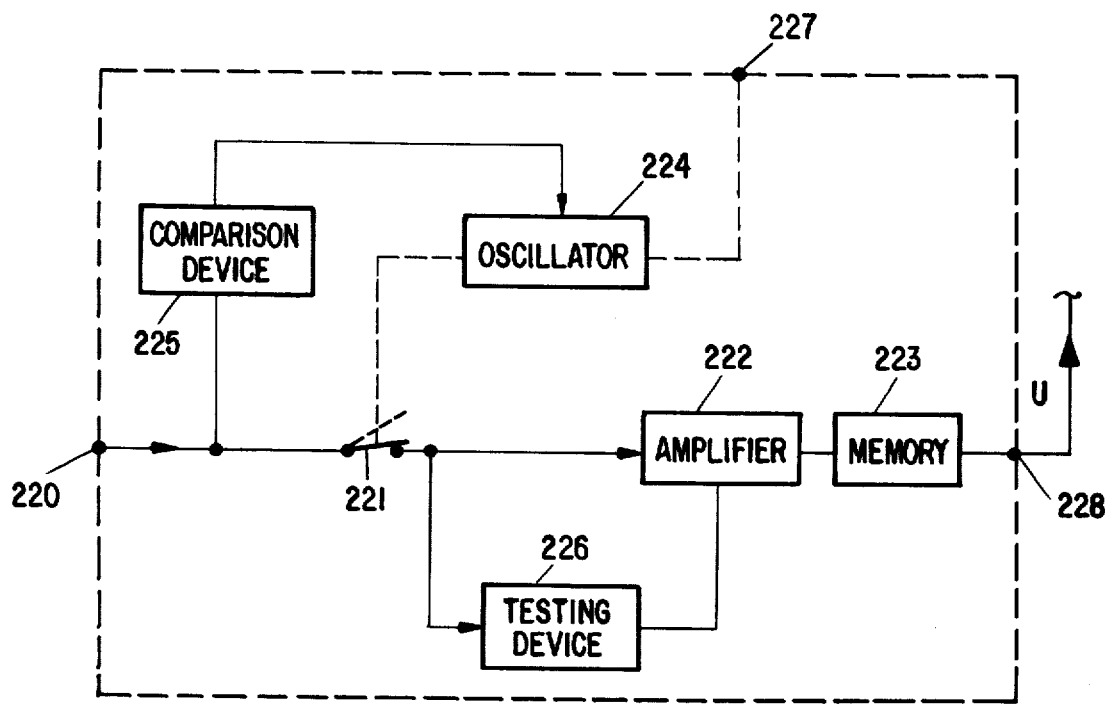
FIG. 4 shows in a blockform one embodiment of the control device of FIG. 1.

Instead of abruptly eliminating the regulating action when the switch-off criterion has been reached, it may also be particularly advisable to eliminate it in stages, for example in dependence on the angular velocity $\dot{\gamma}$. The design of the control device is particularly simple if an oscillator is provided to assign constant time periods for the three operating steps. Additionally, it is very easy to vary or adjust the time periods, particularly as a function of the angular velocity $\dot{\gamma}$. FIG. 4 shows in a block form one embodiment of the control device 22. The measuring device 21 is connected with the input 220. The outputs 227, 228 are connected with the switch 20 as shown in FIG. 1. The input is fed to a switch 221 and to an amplifier 222, which is connected with a memory device 223. Furthermore a testing device 226 is arranged for determining the polarity or algebraic sign of the angular acceleration $\ddot{\gamma}$. Device 226 is connected with the amplifier 222, which is forming the signal U. The control device 22 comprises a timing generator 224 for controlling the positions of switch 221 and switch 20. The generator 224 is connected with a comparison device 225 for the angular velocity $\dot{\gamma}$.

The three operating steps in the first mode of operation as described above will be controlled by the generator 224. In the first operating step the switch 221 is in the position shown and in the memory device 223 a signal U will be stored. In the second operating step the switches 221 and 20 are brought in the position shown in dashed lines by the generator 224. Thereafter in the third operating step the switch 20 is returned to the illustrated position. When in the following step one the angular velocity value has decreased below a selected value, stored in the comparison device 225, the comparison device 225 will stop the oscillator and the switches 20, 221 will remain in the illustrated positions. Now the rough alignment of the first mode of operation is completed. During the subsequent second mode of operation the gyro is aligned with the precise north direction with a high degree of damping.

In the embodiment of a gyroscope according to the invention described above the control device 22 controls the switch 20 and therefore the voltage to the servo motor 8, which is arranged between the housing 4 and the frame 3. In another embodiment of a gyroscope a first torque generator is arranged between housing 4 and frame 3 and a further torque generator is disposed between the frame 3 and the gimbal 12.

Figure 2:
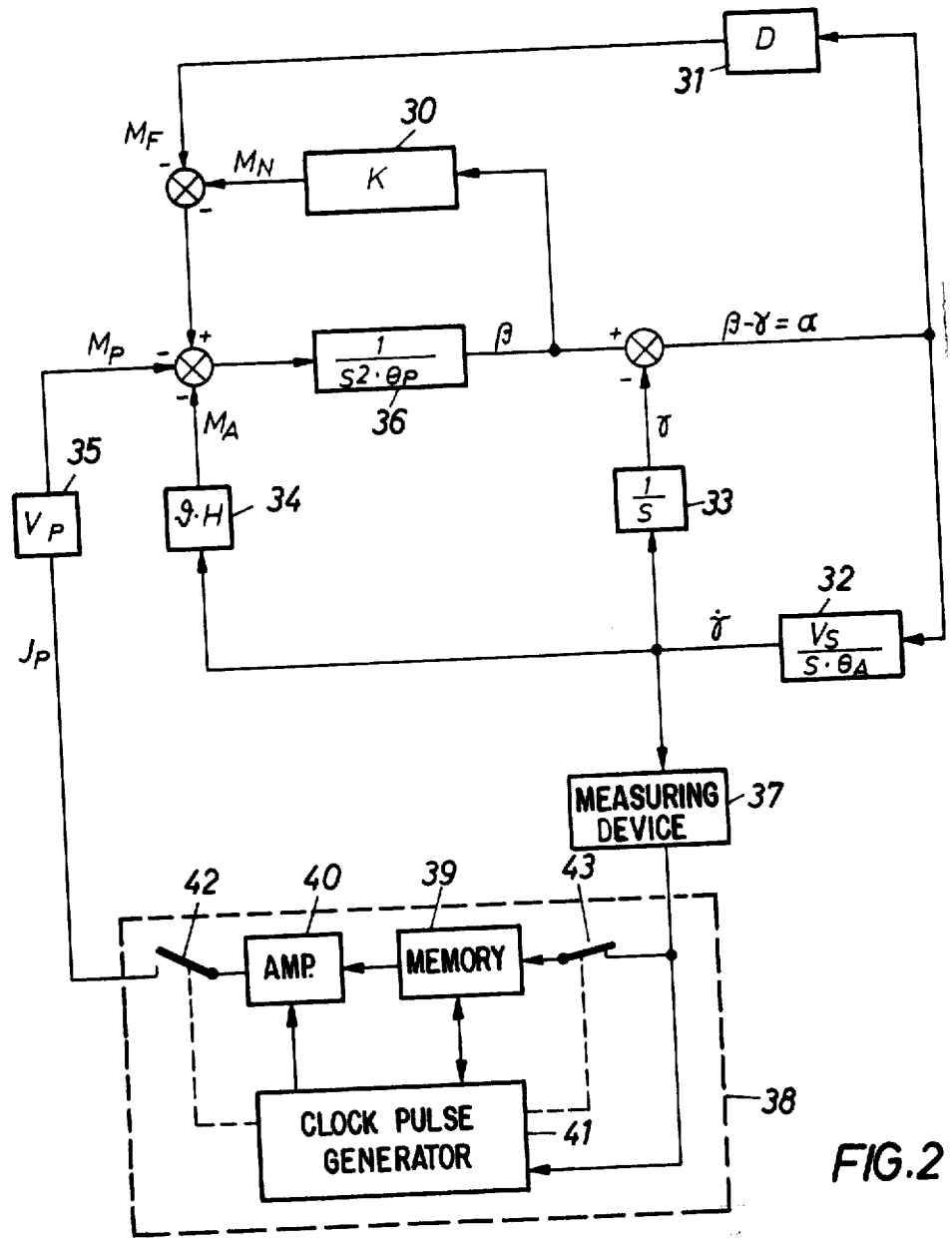
FIG. 2 is a block circuit diagram of a gyroscope according to the invention.

FIG. 2 shows a simplified control circuit diagram for a north-seeking gyroscope of the type shown in FIG. 1, where the setting member is a double integrating torque generator. The legends in the boxes are transfer functions in the frequency domain according to Laplace transformations, where s is the complex variable. It applies for every block that the product of the input value and the block legend equals the output value. The summation points are shown as small circles where the sum of the incoming signals, taking into consideration the algebraic signs, is to equal the sum of the outgoing signals. The solid dots are branching points where the signal is conducted to various points.

Figure 3:
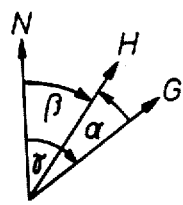
FIG. 3 is a vector diagram used in explaining the operation of the circuit of FIG. 2.

The angles indicated in the block circuit diagram are shown in FIG. 3. N is the geographic north direction while H is the direction of the rotor axis corresponding to axis 1 of FIG. 1 and G the frame reference direction, corresponding to axis 2. At the beginning of a north-seeking process, an angle $\gamma$ exists between the north direction N and the frame reference axis 2. Due to the north-driving moment $M_n$ an angle $\alpha$ appears between the vector G of the frame reference axis 2 and the vector H of the rotor axis. The angle between the north direction N and the rotor axis vector H is $\beta$.

Due to the existence of angle $\beta$ and in accordance with the precession law, the north-driving moment is produced upon rotation of the rotor, which moment is proportional to the sine of the angle $\beta$. For reasons of simplification this proportion is combined in function unit 30 with the spin of the rotor and the horizontal component of the rate of rotation of the earth, to form the constant K. The moment of the springs 15 and 16 which elastically couple the gimbal to the frame and which, as represented by function unit 31, have a spring constant D, also acts on the gimbal.

A servo gimbal including an angle sensor for $\alpha$, an amplifier and a torque generator disposed between the housing 4 and the frame 3, resets the frame in dependence on the angle $\alpha$. This servo device is represented by unit 32 where V is the total amplification of the servo device and $\theta_A$ is the moment of inertia of the frame 3. Unit 34 represents the resetting rate proportional to the resetting speed $\dot{\gamma}$, allowing for the angle of inclination $\delta$. The moment $M_A$ thus produced also depends on the spin H of the rotor.

If a further torque generator is disposed between the frame 3 and the gimbal 12, a torque $M_p$ can become effective, as indicated by unit 35. This torque is proportional to the fed-in current $I_p$ and the degree of amplification $V_p$. The sum of the above-listed moments imparts a rotational acceleration to the gimbal in the north direction such that, under consideration of the inertial moment $\theta_p$ of the gimbal, angle $\beta$ becomes smaller.

The measuring device 37 corresponds to device 21 of FIG. 1 and is connected with a control device 38 corresponding to device 22 of FIG. 1 and including a memory 39 and an amplifier 40. A clock pulse generator 41 closes switches 42 and 43 so that a current $I_p$ can be conducted to the torque generator of unit 35 at least temporarily.

If switch 43 is in the illustrated position the momentary angular velocity $\dot{\gamma}$ is fed into memory 39. In the clock pulse generator 41 the polarity of the angular acceleration is determined, for example by comparison between two successively stored values for the angular velocity. Thereafter in a second operating step switches 42 and 43 are actuated, i.e. switch 43 is opened and switch 42 is closed. Then a current is produced, with the aid of amplifier 40, proportional to the last measured value for $\dot{\gamma}$ stored in memory 39 and corresponding in polarity to the sign of the angular acceleration to accelerate, via torque generator 35, the rotation of the gimbal toward north. Such accelerated resetting thus has a deattenuating effect on the north-seeking gyroscope.

Then instabilities are avoided by a third operating step in which switches 42 and 43 are returned to their illustrated positions. The gyro is then reset, after a brief rest period, with the degree of damping determined by the angle of inclination $\delta$. The above-described regulatory effect during the second operating step is repeated several times in succession until $\dot{\gamma}$ has fallen below a given value, i.e. until the angle $\gamma$ is almost zero.

The rough alignment is thus completed and during the subsequent fine alignment the gyro is aligned with the precise north direction with a high degree of damping. Due to the thus resulting reduction in the degree of damping during the rough alignment the entire north-seeking time is substantially shortened. Nevertheless low sensitivity to interference is achieved during the fine alignment.

It should be noted at this point that the presence of the angle of inclination $\delta$, taken into account in unit 34, does not constitute a positive prerequisite for the present invention, but is advantageously provided. As can be seen in FIG. 2, the angle of inclination can also be replaced by the measuring device 37, control device 38 and, for example, torque generator 35. In this case it must be assured, by means of control device 38, that the degree of damping is low during the rough alignment and, because of the interfering moments to be expected during fine alignment, the degree of damping is correspondingly higher.

In FIG. 1 an embodiment of a gyroscope is shown whereby the gimbal 12 is arranged within the frame 3 by journals. It will be understood that a northseeking gyroscope according to the present invention may also comprise a gimbal which is suspended on strips or floated in a liquid for example.

It will be understood that the above description of the present invention is susceptible to various modifications, changes and adaptations, and the same are intended to be comprehended within the meaning and range of equivalents of the appended claims.

I claim:

1. In a north-seeking gyroscope composed of a housing;

a frame member journalled within the housing for rotation relative to the housing about a vertical axis;

a gimbal member arranged within the frame member for rotation relative to the frame member about a substantially vertical axis;

a gyro rotor journalled within the gimbal member for rotation about an axis substantially perpendicular to the rotation axis of the gimbal member for producing a force tending to align the rotor axis with geographic north; and servo means normally connected for rotating the frame with a selected degree of damping in a direction to establish a predetermined angular null position between the gimbal and the frame and a predetermined angular orientation of the frame corresponding to geographical north;

the improvement comprising control means responsive to the value of a parameter indicative of the deviation of the frame from geographical north for temporarily rotating said frame at an increased rate, and with a degree of damping lower than such selected degree, in such direction only upon the occurrence of parameter values indicating that the angular deviation of said frame from geographical north exceeds a selected magnitude, said control means including: measuring means for measuring the value of such parameter; memory means for storing a representation of such measured value; and switching means operatively connected between said measuring means, said memory means and said servo means and switchable between a plurality of states for producing an operating sequence including: storing a representation of a measured value produced by said measuring means in said memory means; applying such stored representation to said servo means for producing such increased rate of frame rotation; and terminating the action of said control means.

2. An arrangement as defined in claim 1 wherein said parameter is the angular velocity of said frame member, said servo means comprises a servo motor having a rotatable shaft connected to drive said frame member, and said measuring means comprises a measuring device connected to said shaft for producing a signal representative of such angular velocity.

3. An arrangement as defined in claim 2 wherein said switching means includes a switch connected to the output of said memory means and a clock pulse generator connected to close said switch only during the portion of such sequence during which such stored representation is applied.

4. An arrangement as defined in claim 1 wherein the pivot axis of said gimbal member is inclined to the pivot axis of said frame member in such a manner that the direction from the pivot axis of said gimbal member to the pivot axis of said frame member coincides with the direction of rotation of said gyro member, the angle of inclination between such pivot axes being perpendicular to the axis of said rotor when said predetermined angular null position exists between said gimbal member and said frame member.

5. An arrangement as defined in claim 1 wherein said control means are arranged to cause only said servo means to act on said frame when the value of said parameter is below a selected level.

* * * * *